Patented June 10, 1952

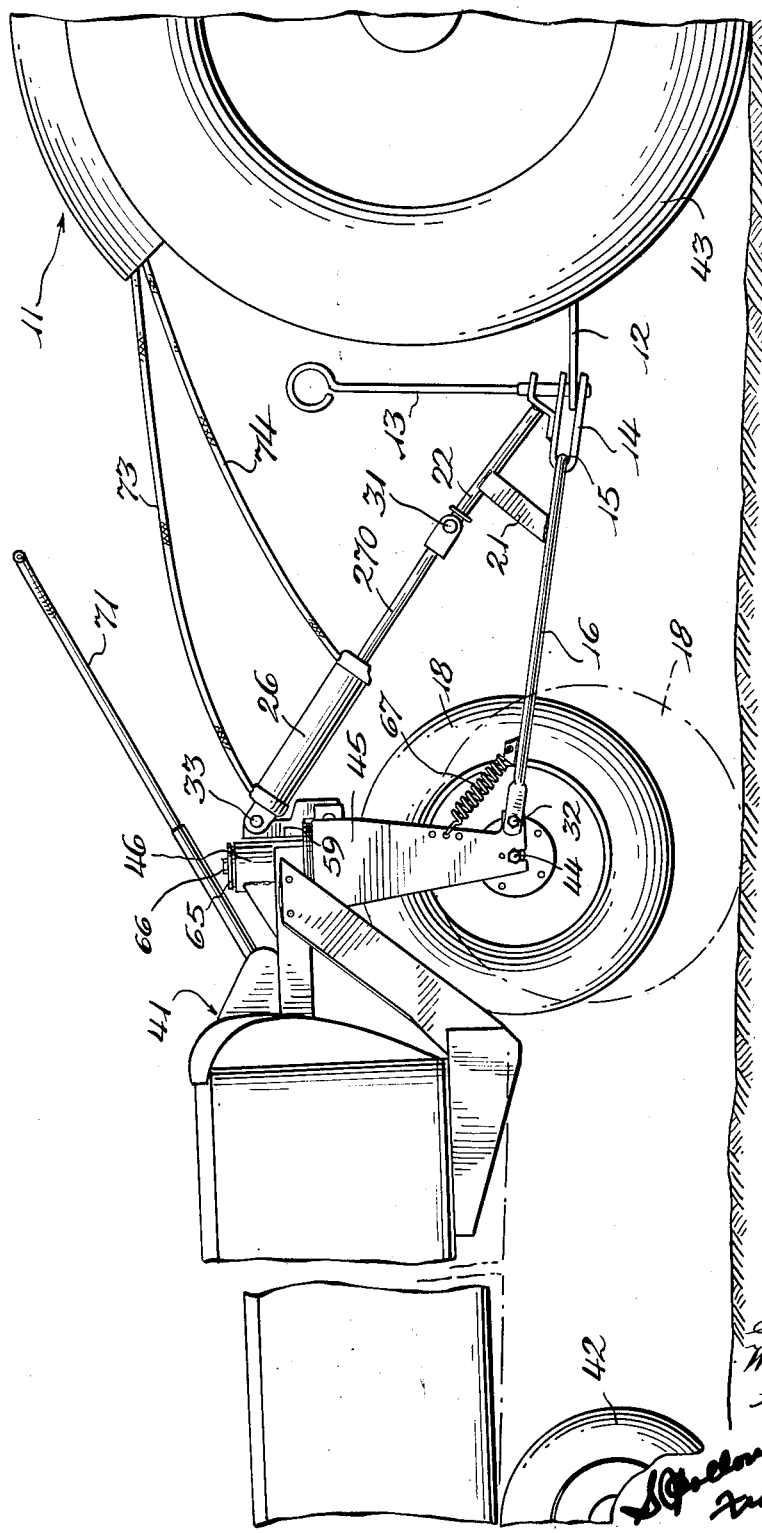

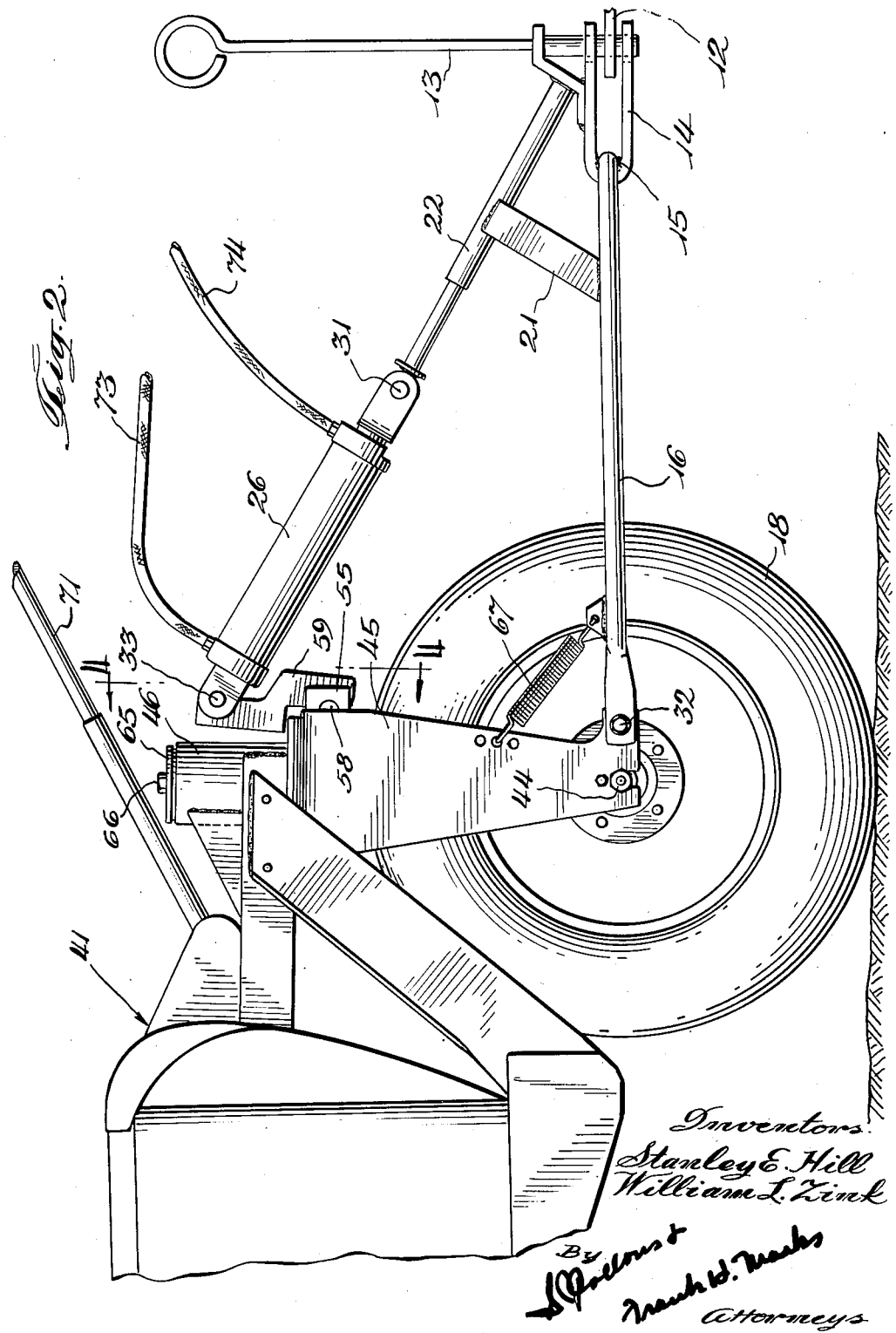

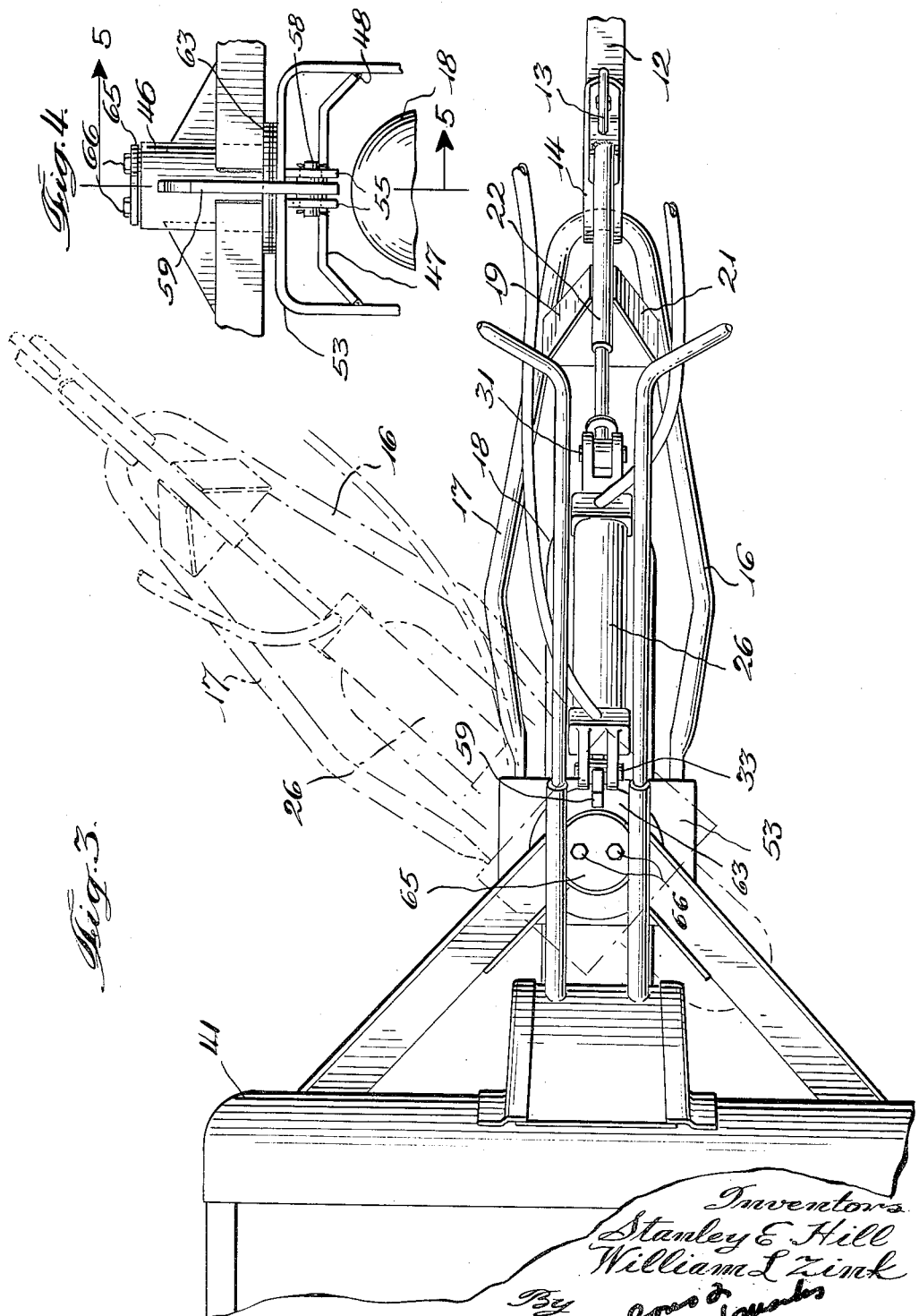

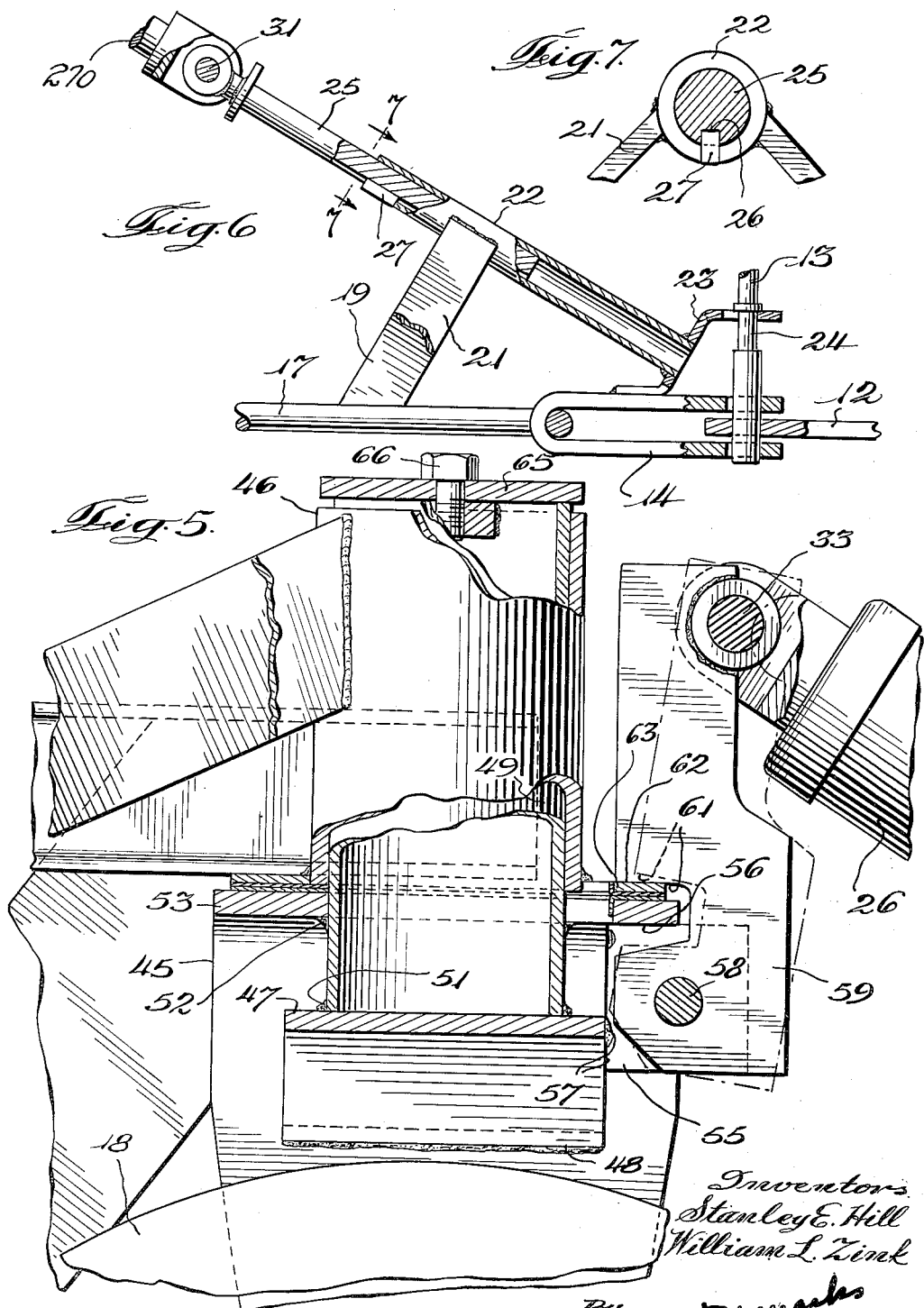

2,599,993

UNITED STATES PATENT OFFICE 2,599,993

HYDRAULIC LIFT FOR VEHICLES

Stanley E. Hill, Kankakee, and William L. Zink, Plano, Ill., assignors to Sears, Roebuck and Co., Chicago, Ill., a corporation of New York Application September 13, 1948, Serial No. 48,976

2 Claims. (Cl. 280—33.2)

The present invention relates to improvements in farm vehicle coupling and concerns itself more particularly with the provision of a hydraulic lift applied to the forward end of trailer vehicles in order to secure certain advantages incident to control and maneuverability.

Various types of draft implements such as are used in farming and drawn by a tractor are ofttimes powered by or through the instrumentality of a tractor motor. At the same time these units and others, require to be drawn to and fro during land processing operations when it is intended closely to cover acreage and when these operations are required to be done by a single worker or with the assistance of at best perhaps unskilled or juvenile help. A typical illustration of this class of operation is that of preliminary land processing machinery such as fertilizing or sowing.

Such operations require that the traction vehicle draw behind it one or more land processing implements and be enabled to make sharp backdoubling end turns as the operations proceed furrow on furrow. Without the advantages of close maneuverability, while undertaking such operations, land conditioning is less efficiently achieved and in the case of fertilization, for example, soil replenishment is accomplished only in an erratic or spotty manner inimicable to the best interests of soil nutriment and permitting of waste, both factors of which are costly and detrimental to crop production.

It is accordingly a principal object of this invention to provide a traction gear which is particularly suitable for implements that are to be drawn by power tractors such that an effective integration or intercoupling between the prime mover and the trailer implement is achieved, so as to make the two maneuverable as a single unit whereby furrowing may be accomplished in closely spaced regulation and without requiring greater than normal end turn space for the attainment of compact parallel-row travel.

For a better understanding of the present invention and the manner in which it is attained reference will now be had to the accompanying drawings and to the following detailed specification, in which like reference numerals designate corresponding parts throughout and in which:

Fig. 1 is a side elevational view of tractor and trailer vehicles connected together by an hydraulic hitch embodying certain principles of the present invention;

Fig. 2 is an enlarged side elevational view of the same device illustrating the hydraulic apparatus in a different condition of operation;

Fig. 3 is a fragmentary plan view of the hydraulic coupling apparatus in both dotted and broken line positions;

Fig. 4 is a fragmentary view with parts broken away and is taken approximately on line 4—4 of Fig. 2;

Fig. 5 is an enlarged transverse sectional view taken approximately on line 5—5 of Fig. 4;

Fig. 6 is a fragmentary side elevational view of certain parts of the coupling mechanism showing portions in section; and Fig. 7 is a transverse sectional view taken approximately on line 7—7 of Fig. 6.

Referring now more particularly to the drawings, a tractor implement is designated by the general reference characteristic 11. This vehicle may be a four-wheeled or tricycle device, preferably being equipped with a drawbar 12, which extends rearwardly therefrom and is provided with an opening at its end through which there may be passed a coupling pin 13 for effecting connection between said drawbar 12 and a coupling clevis 14 as best indicated in Figs. 1 and 2. The clevis 14 is preferably welded as at 15 to a connecting yoke consisting of the side members 16 and 17 bent to straddle with clearance the single forward wheel 18 of a tricycle trailer.

The yoke 16—17 is further made rigid by being welded to a pair of angularly disposed truss bars 19 and 21 which in turn are welded secure to a guide sleeve 22, Fig. 6. The lowermost end of the guide sleeve 22 extends through and is integrated with an ear bracket 23, whose coupling opening is designed to align with those of the clevis 14. Moreover the coupling pin 13 may be reduced in diameter as at 24 where it passes through the opening of the ear 23, affording such movement only to the pin 13, as will permit it to be withdrawn from coupling engagement with the drawbar 12 but yet safeguarding against its total withdrawal from the clevis assembly.

Into the guide sleeve 22 there is adapted to chamber in close fitting relationship a thrust pin 25 having a longitudinal key way 26 into which there fits the projection or key 27, Fig. 6, of the sleeve 22. In this way, the shaft or guide pin 25 is maintained in parallel non-rotary confinement subject to be inserted into or withdrawn from the tube 22 when the hydraulic housing 26 accordingly expels or withdraws its internal contained piston and associated connecting rod 270.

Thus, while a limited pivotal freedom is afforded as between rods 25 and 270 due to the pivotal connection 31 therebetween, this is not enough to do any more than correct for marginal misalignment or friction. Effective confinement of the guide bar 25 within its tube 22 maintains the assembly in linear alignment so that, as already stated, the expulsion or contraction of the piston and housing assembly 26 will be made to cause a corresponding lengthening or contraction of the hypotenuse elements of a triangle whose sides correspond to imaginary line paralleling the side frames 16 and 17 of the yoke and an imaginary line passing through the pivots 32 and 33, Fig. 2, of the yoke and piston elements, respectively.

The angular relationship between the hypotenuse elements and the yoke is rigidly maintained by the already described triangular truss formation 19 and 21, whereby the tube 22 is integrated with the yoke 16—17. Consequently, any elongation of the hypotenuse elements will necessarily tend to separate or widen the distance between pivots 31 and 33, but because the truss 19—21 prevents full freedom in this direction except as afforded by the pivot 31, the elongation aforedescribed results only in a lifting of the pivot 33 vertically in respect to the trailer vehicle because the link or yoke 16—17 prevents such vehicle from changing its distance from the drawbar 12.

In the instant embodiment of apparatus, the drawn or trailer vehicle 41 is a three-wheeled manure spreader provided with equipment for distributing fertilizer such as granular material or manure. At its rear it has two trailer wheels 42 which are adapted to track behind the large tractor wheels 43 of the prime mover 11. The single guide wheel 18 at the front of the trailer vehicle is pivoted as at 44 in a fork 45 journaled in end thrust support bearing 46, detailedly illustrated in Fig. 5. The steering fork 45 will be observed in Fig. 5 to have a reinforcing plate 47 which is welded as at 48 to the tines of the fork while a tubular post 49 which is journaled in the sleeve 46 is secured as by welding at 51 to the reinforcement 47 and as at 52 to the shoulder 53 of the fork 45.

It will thus be seen from the aforedescribed integration of parts that the entire fork assembly, including the pivotal stud 49 and the other parts which constitute the fork proper, rotate as a unit in the journal 46 much after the manner in which the front wheel fork of a bicycle does so in effecting vehicular guidance and control. In Fig. 5, it will be observed that a pair of lugs 55 welded as at 56 and 57 to the shoulder 53 and bar 47, respectively, constitute a pair of trunnion ears for a stub shaft 58 and that between them pivotally supported on said shaft 58 is a camming lock plate 59. The edge of plate 59 adjacent the trailer fork is cut out as at 61 with a significantly profiled contour so as to provide a top edge which will bite against the upper surface 62 of the flange plate 63 which is welded to sleeve 46. This occurs, however, only when the plate 59 has been rocked counter-clockwise about its pivot 58 and resumes the position designated in full lines in Fig. 5. In its opposite position, which has been designated in this portrayal by broken outline, the edge 61 clears the top surface 62 of flange 63 permitting the fork assembly to rotate freely with respect to the journal 46 and its flange.

Accordingly, it is to be understood that the aforedescribed clamping action of plate 59, integrating the fork shoulder 53 with the flange 63 during the elongated condition of the hypotenuse elements, prevents free play or steering rotation of the front wheel assembly which would otherwise result, particularly during draft, of a shimmying or swaying by the trailer to a greater extent than is made possible by means of this clamping action acting on the steering wheel.

The fork assembly 45 may be held against inadvertent removal from the pivot 46 by a cap disc 65 held upon the end of the pivot 49 with cap screws 66. When the piston in the unit 26 is released, that is to say contracted, shortening the hypotenuse line, the assembly is permitted to resume the relationship portrayed in Fig. 2 and the return spring 67 narrows the angle between the yoke assembly 16—17 and the above described imaginary line which crosses pivots 31 and 33. At the same time the front wheel 18, which has been made to rise clear of the ground level during the elongation period of the hypotenuse elements, now resumes its normal condition as the camming plate 59 is relaxed and frees the fork 45 to rotate in its journal 46.

When not drawn by a tractor, the trailer vehicle may be uncoupled by lifting the coupling pin 13 and permitting the drawbar 12 to be removed from between the clevis elements. The vehicle may then be pulled manually as by the handle 71 and the vehicle drawn from one point to another by pivoting the front wheel after the manner indicated in dotted outline in Fig. 3.

Tractor implements, such as those designated 11, are customarily provided with auxiliary drive shaft projections. Through such power take-off they may be equipped with well known types of hydraulic compressor pumps which serve to maintain a constant operating pressure usually of between 600 to 1500 pounds, according to previous setting adjustments and the nature of achievement intended to be performed. From its generating point at the pump, this pressure is directed to a convenient location near the seat occupied by the tractor vehicle operator, and in accordance with a regulating valve he is enabled to direct fluid pressure to one or the other of two flexible conduits 73 and 74, at the same time permitting the other of said two conduits to function as a return for the fluid pressure back to its generating source. The manner in which valvular control over these types of operating pistons is obtained is well known in hydraulic devices and kindred apparatus.

While the present invention has been explained and described with reference to a specific pictorial representation in the accompanying drawings and by the use of arbitrary descriptive in the foregoing specification, it is to be understood nevertheless that numerous variations and modifications may be made without departing from the essential spirit or scope thereof. It is accordingly not intended to be limited by the specification language or illustrations employed in the foregoing, except as indicated in the hereunto appended claims.

The invention claimed is:

1. An apparatus for connecting tricycle trailer vehicles to tractors comprising, a single forward wheel truck for said trailer vehicle comprising a wheel straddling fork having on its tines lowermost connecting projections and uppermost connecting projections, a swivel turret between said forward wheel truck and a carriage portion of said trailer vehicle, a pivotable cam plate carried by said uppermost projections for clamping together said truck and said frame to prevent relative movement therebetween, a drawbar connecting the lowermost projections with a tractor hitch, an angularly disposed element forming part of said hitch and connecting between a lowermost forward portion thereof and said pivotable cam plate, and means for elongating said angularly disposed element whereby the forward truck of said trailer vehicle may be raised while at the same time said control plate is moved into truck locking position.

2. An apparatus for coupling and for achieving maneuverability of a trailer vehicle having foremost and rearmost wheel support means, by a tractor comprising, a connecting linkage having a rigid horizontal draft bar and an elongatable hydraulic lift angling between a lower forward portion of said linkage and a higher forward portion of said trailer vehicle, hydraulic fluid conduit means for regulating the length of said lift, a front wheel locking mechanism, means controlled by said elongatable linkage for actuating said locking mechanism during the elongated condition of said linkage, and valvular controls for regulating the passage of fluid through said conduit means for thereby raising fore-portion of said trailer vehicle clear of the ground level and for simultaneously locking said mechanism whereby to intergrade the trailer and tractor vehicles during the elongated condition of said linkage.

STANLEY E. HILL.
WILLIAM L. ZINK.

REFERENCES CITED

The following references are of record in the file of this patent:

UNITED STATES PATENTS

| Number | Name | Date |
| --- | --- | --- |
| 2,360,901 | Simmons | Oct. 24, 1944 |
| 2,382,449 | Simmons | Aug. 14, 1945 |